United States Patent [19]

Hofestädt et al.

[11] Patent Number: 5,586,116
[45] Date of Patent: Dec. 17, 1996

[54] METHOD FOR ROUTING MESSAGES

[75] Inventors: Holm Hofestädt, Braunschweig; Erwin Reyzl, München, both of Germany; Peter Thompson, Horfield, Great Britain

[73] Assignees: Siemens Aktiengesellschaft, Munich, Germany; INMOS Limited, Bristol, Great Britain

[21] Appl. No.: 81,386

[22] PCT Filed: Dec. 16, 1991

[86] PCT No.: PCT/EP91/02412

§ 371 Date: Jun. 24, 1993

§ 102(e) Date: Jun. 24, 1993

[87] PCT Pub. No.: WO92/11718

PCT Pub. Date: Jul. 9, 1992

[30] Foreign Application Priority Data

Dec. 24, 1990 [GB] United Kingdom ................ 90314273

[51] Int. Cl.$^6$ .................................................. H04L 12/56
[52] U.S. Cl. ............................................................ 370/389
[58] Field of Search .......................... 370/60, 94.1, 60.1, 370/61, 94.3, 94.2, 85.13; 340/825.02, 825.03

[56] References Cited

U.S. PATENT DOCUMENTS

| 4,754,451 | 6/1988 | Eng et al. | 370/60 |
| 5,179,558 | 1/1993 | Thacker et al. | 370/60 |

Primary Examiner—Douglas W. Olms
Assistant Examiner—Dang Ton
Attorney, Agent, or Firm—Hill, Steadman & Simpson

[57] ABSTRACT

In a network with switching elements, a transmission path is found in that each destination address at a switching element is allocated a group of outputs via which messages can be transmitted to this destination address. Within this group of outputs, a search is made for a free output and messages are buffered as long as there is no output free within this group. Thus, in the process, there is deliberately no exclusive use of a specific output and each destination address is allocated a plurality of possible outputs. As a result, the probability of a blockage of outputs is reduced and the network throughput is increased.

2 Claims, 2 Drawing Sheets

METHOD FOR ROUTING MESSAGES

BACKGROUND OF THE INVENTION

The invention relates to a method for transmitting messages in packet switching networks.

DESCRIPTION OF THE RELATED ART

In packet switching networks, a message is not transmitted between a transmitter and a receiver in that a permanent connection is established between the transmitter and the receiver via which information is transmitted between transmitter and receiver. Instead, the information is transmitted in the form of packets which consist of an address header and an actual message component possibly of variable length which independently seek out their path to the receiver through the network. For this purpose, at each network node there is a switching element which evaluates the address information of each packet and passes on the packet along a suitable path.

Such packet switching networks are used in various fields of communication and data technology, especially in the field of parallel-computer connection networks. With the aid of such packet switching networks, considerably more information can be transmitted with the same line capacity than in conventional networks in which between each transmitter and each receiver a line which is reserved for this transmitter-receiver pair has to be established. Especially in parallel-computer connection networks, this method is based on the highest possible network throughput since the computing power of a parallel-computer system depends in a sensitive manner on the network throughput of its connection network. In such packet switching networks, when the switching units are involved in corresponding activity blockages occur repeatedly and greatly reduce the network throughput. These blockages can be avoided by correspondingly increasing the number of outputs per switching element or by controlling the network centrally, which, however generally would lead to unacceptably high costs or would involve a central control of the network, which is not desired.

An output of a switching element is blocked if at any time two or more packets require the same output to continue their path. Except for one, all these packets must be buffered. This can take place either completely within the switching element in question or be distributed over several switching elements.

From the literature, distributed methods are known which are used to transmit messages in packet switching networks. The common feature of these methods is that precisely one output is associated with each transmission node of the network at each receiver address. With correspondingly high capacity utilization of a network in parallel-computer connection networks, considerable blockages can occur at individual outputs, during which blockages a large number of packets have to be buffered. As a result of these blockages and the reduction of the network throughput associated with these blockages, perceptible degradations in performance can occur in parallel-computer systems.

SUMMARY OF THE INVENTION

The invention is based on the object of disclosing a method for routing messages in packet switching networks which avoids the described disadvantages of known methods and which is suitable for bringing about an increased network throughput in such networks. This object is achieved with the aid of a method for routing messages whereby
— each destination address at each switching element has a group of outputs of this switching element assigned to it,
— a free output is sought within this group,
— the message is delayed as long as no output is free within the group, and
— the individual outputs of a group are connected to different transmission paths.

Advantageous developments of the method include providing that the of a group of outputs takes place in such a way that each destination address has a sub-set of all the destination addresses allocated to it and each of these sub-sets has a group of outputs assigned to it. Further, in method may include:
— the set of all destination addresses has an address interval assigned to it which is subdivided into address sub-intervals,
— the set of all outputs has an output interval assigned to it which is subdivided into output sub-intervals and
— each address sub-interval has an output sub-interval allocated to it.

DETAILED DESCRIPTION OF THE PREFERRED EMBODIMENTS

The invention is described in greater detail below with reference to a preferred exemplary embodiment and to the figures.

A typical area of application of the invention is connection networks in parallel-computer systems since, in such systems, intensive communication is required between the system elements, which communication generally leads to high network loading. The effects of the invention are more advantageous the higher the network loading. For this reason, the invention is described below with reference to an exemplary embodiment from the field of parallel-computer networks.

So-called transputer systems form an important class of parallel-computer systems. The technical foundations of these systems are described in the publication by D. May and P. Thompson, "Transputers and Routers: Components for Concurrent Machines", Proceedings of Japanese Occam User-Group, 1990. The publication by D. Pountain, "Virtual Channels; The next generation of Transputers", BYTE April 90, Europe and World: 3–12, Apr. 1990, contains a comprehensive presentation of the new transputer generation which operates with virtual addresses. The specialized terms used in this description from the field of parallel-computer systems are generally known and taken from the technical articles that have been cited.

Figure 1:
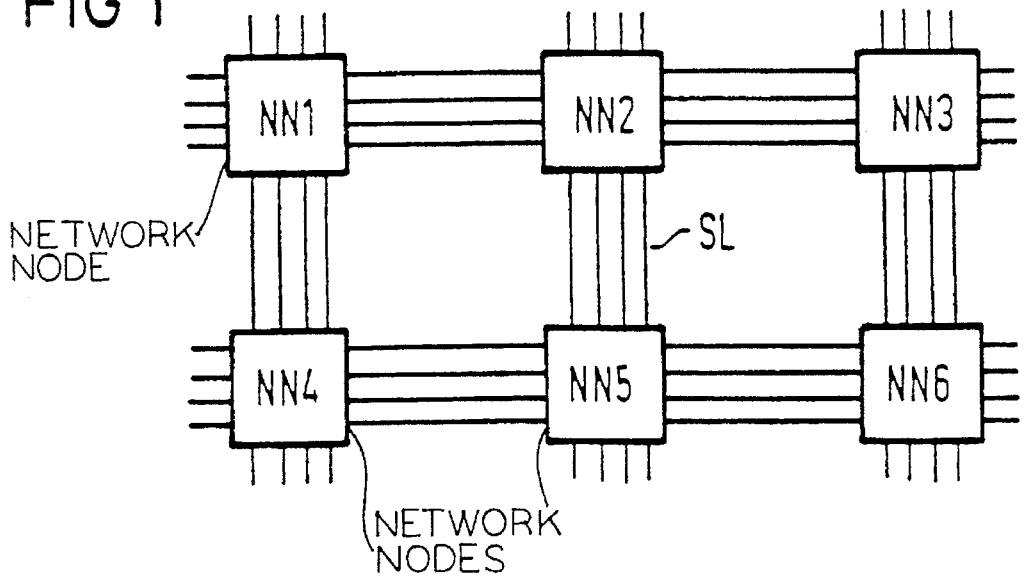
FIG. 1 shows a parallel-computer network.
Figure 2:
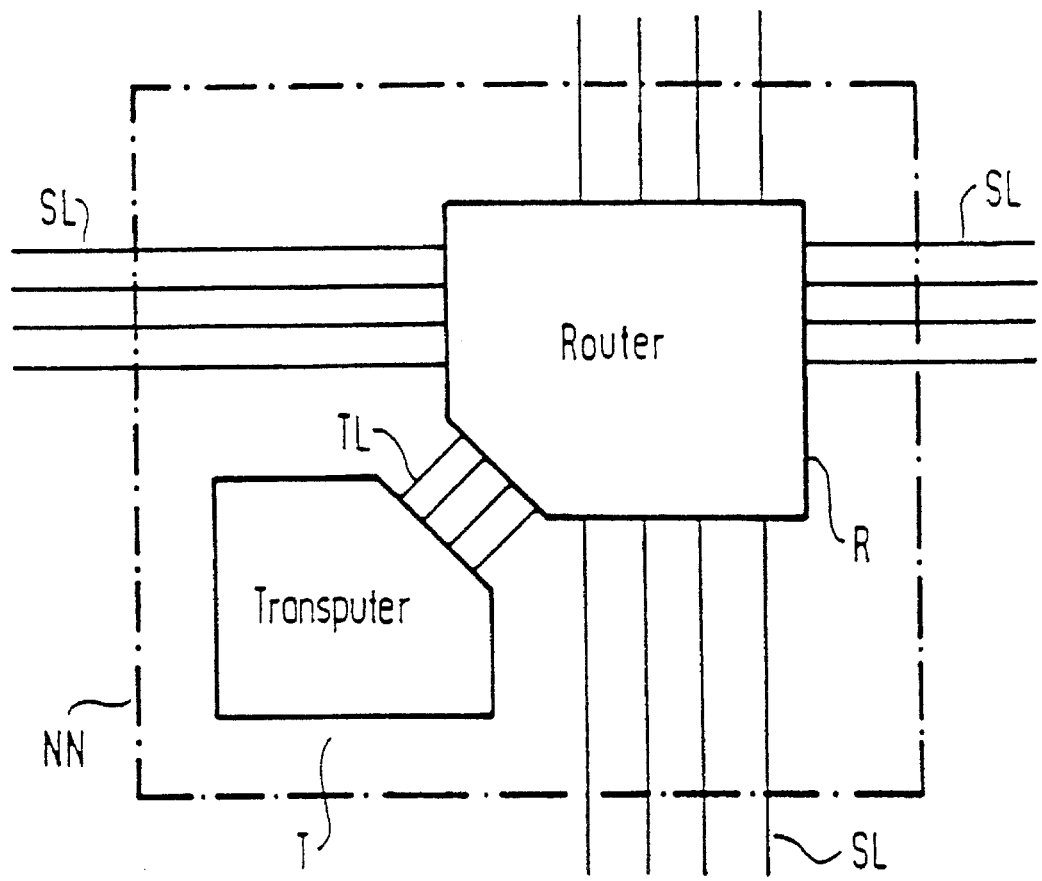
FIG. 2 shows a network node of the network in FIG. 1, which comprises a transputer with a switching element (router).

FIG. 1 shows a typical connection network with six network nodes NN1, . . . , NN6. Each connection node here has for example the form indicated in FIG. 2 which consists of a connection element (router) and a processor element (transputer). Each network node is connected via a number of network connections SL to further network nodes, as can be seen in FIG. 1. Each network node contains, as illustrated in FIG. 2, a processor element, for example a transputer, which is connected via a number of transputers on the left to the connection element. During operation of such a transputer element, the individual processor elements T generally have to exchange information intensively. In this process, information must generally be transmitted from any processor element of a network node NNi to any other network node NNj. For reasons of cost, a direct networking of all these transputer elements is generally not possible.

With the aid of transputer elements and switching elements, very different network types with different processor numbers and different network topologies can be built up. The transmitting transputer T1 transmits a message to the receiving transputer T2 in the form of a packet (of variable length) which consists of an address header and the actual message. This packet is sent by the transmitting transputer via one of its connections TL to the switching component connected to it, which component subsequently carries out the further switching of the message. The switching component subsequently assigns the destination address of the message to a group of outputs which is suitable for transmitting the message to this destination address. The switching component carries out a search for a free output from this group of outputs. If the component finds a free output, it then transmits the message to this free output. If there is no free output in the group, the message to be transmitted is buffered in a waiting queue until an output within the group has become free.

Figure 3:
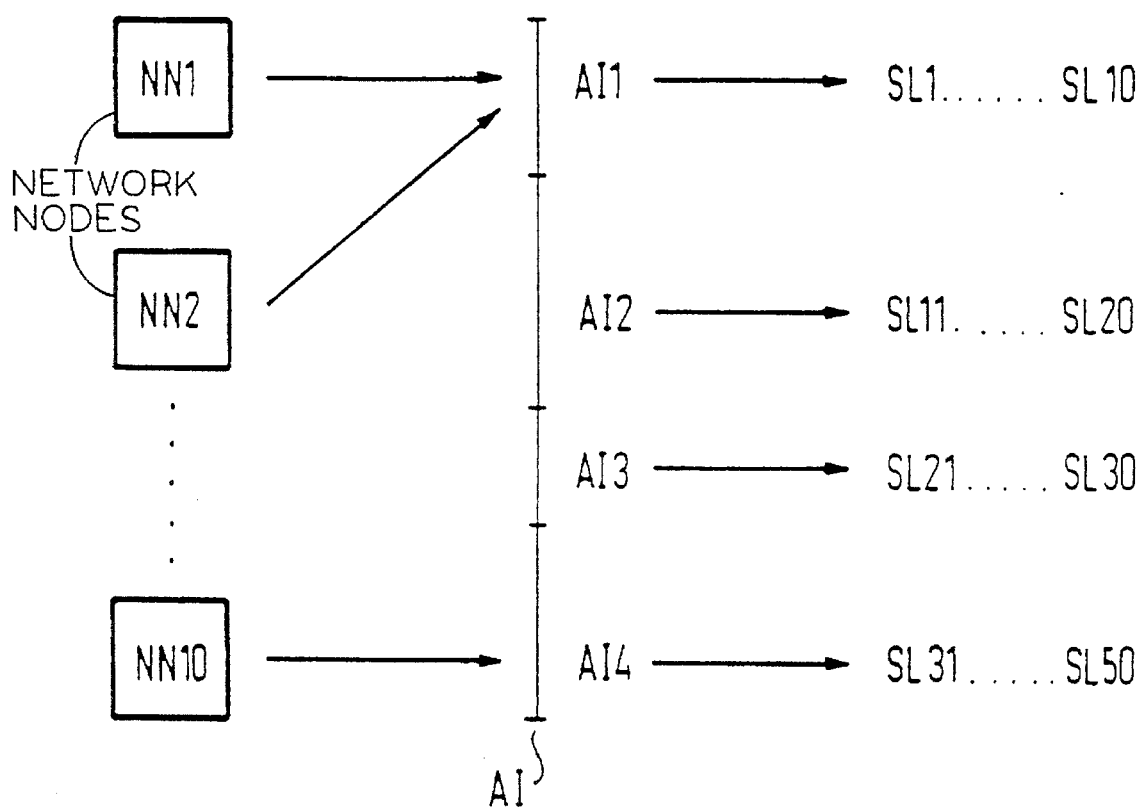
FIG. 3 shows the improvement in interval routing according to the invention.

The assignment of a group of outputs to a destination address can take place in various ways. A preferred method is based on known interval routing. The method of interval routing is described in the publication by J. van Leeuwen, R. B. Tan: "Interval-Routing", The Computer Journal, Vol. 30, Nov. 4, 1987, pp. 298–307. In this method, the entire address space, that is to say the set of all destination addresses is mapped onto an address interval AI, as can be seen in FIG. 3. This address interval is subdivided into a plurality of sub-intervals AI1 . . . , AI4. Each destination address is assigned an address sub-interval. In the known interval routing, each address sub-interval AIn is unambiguously assigned one output. According to the invention, instead, each address sub-interval AIn is assigned an interval of outputs.

If the destination address of a packet falls within an address sub-interval AIn, there is then a search for a free output in the group. If there is such a free output, the packet is then passed on via the output. Otherwise, the packet has to be buffered and placed in a waiting queue. The search for a free output can proceed here as follows (see attached Modula 2 program):

A local pointer (nextout) which is assigned to the group of network connections points, before the search process, to the successor of that output via which a packet of this group was last passed on. The pointer now runs from this position successively over all the outputs of the group until a free output is found. This can be indicated in this case for example via an appropriate signal (flag) at the outputs. If a free output is found, the packet is passed on via the output and the pointer remains at the subsequent position. Otherwise, the packet is placed in the waiting queue of that output to which the pointer pointed before the search process and the pointer is set to the subsequent output of this group.

Apart from the method of interval routing, any deterministic routing method can be generalized in this manner. Instead of an unambiguous network connection, according to the invention a group of network connections can be associated here with every destination address. In this way, not only is the optimum network connection for routing a message to a destination address used but also further (possibly) almost optimum network connections are used. In this way, the probability of blockage of a network connection is considerably reduced. The principle of operation of the invention is based on this idea.

Simulation results indicate that, with high network capacity utilization, the throughput of a binary cube network can be increased with the aid of the invention by more than 20%. A representative example of program subroutines for routing according to the present invention is set forth in Appendix 1.

Although other modifications and changes may be suggested by those skilled in the art, it is the intention of the inventors to embody within the patent warranted hereon all changes and modifications as reasonably and properly come within the scope of their contribution to the art.

```
IMPLEMENTATION MODULE C104;
(************************************************************
*****
  object oriented declaration of C104 routing chip model in
MODULA 2
  The following shortened code describes the data structures
and the
  additional C104 mechanisms concerning adaptive routing.
  The method det_out contains the details of the adaptive
routing mechanism.
  It operates on data structures describing the C104 status.
This data
  structures are defined first.
  ************************************************************
******)
FROM ENTITY IMPORT
       Entity;                    (* root object *)
FROM H1 IMPORT
       MAX_processorports;
CONST
       MAX_switchports = 32;      (* number of C104 links *)
TYPE
   (*****
   The local routing decision is based on a table of labels.
   This table includes the partitioning of the address space
(value),
   the mapping of the address intervals on the link groups
(link, width),
``` and the actual pointer to a link of the link group
(nextout)
*****)
   Label = POINTER TO ARRAY [0 . . . MAX_switchports-1] OF LabelR;
    LabelR = RECORD
        value: CARDINAL;
        (* upper boundary of the address interval.
          the preceeding label in the table defines the lower boundary *)
        link : CARD255;
        (* first outgoing link of the link group *)
        width: CARD255;
        (* width of the link group. number of links in the link group *)
        nextout : CARD255;
        (* pointer to the next link out of the link group *)
   END;
(*****
  data structure for the outgoing C104 links
*****)
   C104OutportR = RECORD
        (* network interconnection scheme *)
        connection_to   : Entity;      (* pointer to the next connected component *)
        inp             : CARD255;    (* ingoing link of this component *)
        (* internal C104 status *)
        in_to_out     : CARD255;    (* ingoing link conncted to outgoing link *)
        activated      : BOOLEAN;    (* flag=TRUE if outgoing link is occupied *)
   END;
   Outport = ARRAY [0. . . MAX_switchports-1] OF C104OutportR;
   (* 32 Outgoing links *)
TYPE
   C104 = OBJECT (Entity)
        label: Label;          (* table of at most 32 labels *)
        max_labelnr: CARD255;  (* last defined label *)
        outport: Outport;      (* 32 outgoing links *)
(************************************************************
   C104 method determining outgoing link to send next packet on
************************************************************)
      METHOD C104.det_out ( dest: CARDINAL; VAR out: CARDINAL );
      (*   determine outgoing link to transmit packet
          dest   : destination address of the packet
          out    : index of the outgoing link to transmit packet
*)
      VAR (* local variables used at det_out *)
         low: CARDINAL;       (* lower boundary of address interval *)
         labelnr: CARDINAL;     (* actual label index *)
         i: CARD255;            (* running index *)
      BEGIN
        (* 1. Determine interval including destination address *)
         (* start with label^[0] *)
         low := label^[max_labelnr].value;
         labelnr:=0;
         (*   select interval including destination address,
            labelnr at leaving LOOP determines link group *)
         LOOP
           (* normal interval *)
           IF (low<label^[labelnr].value) THEN
             IF (dest>low) AND (dest<=label^[labelnr].value) THEN
               EXIT;     (* interval determined *)
             END;
           (* interval includes destination address 0 *)
           ELSIF (low>label^[labelnr].value) THEN
             IF (dest>low) OR (dest<=label^[labelnr].value) THEN
               EXIT;   (* interval determined *)
             END;
           (* empty interval *)
           ELSE
           END;
           (* actual interval does not include dest,

```
                go to check next interval *)
        low := label^[labelnr].value;
        INC(labelnr);
        (* error if no interval includes dest *)
        IF labelnr>max_labelnr THEN
            error("NETLIB: C104.det_out no interval
selected");
        END;
    END; (* LOOP *)
    (* now, actual value of labelnr determines link group to
send packet on *)
    (* 2. Look for available link within the group
determined by labelnr *)
    WITH label^[labelnr] DO
        i:=0; (* start with next link of the group *)
        LOOP   (* look for any link available *)
            IF i=width THEN
            (* All links examined, but no link of the group is
available.
            Take next one to transmit packet *)
                out := link + nextout;
                nextout := (nextout+1) MOD width; (* new next
link *)
                EXIT;
            END;
            (* actual outgoing link available ? *)
            IF NOT outport[link+(nextout+1) MOD
width].activated THEN
                (* this link available *)
                out := link + (nextout+i) MOD width;
                nextout := (nextout+i+1) MOD width;
                EXIT;
            END;
        END;
        (* actual link not available, continue with next
link *)
        INC(i);
    END; (* LOOP *)
    END; (* WITH label^[labelnr] *)
    (* now, outgoing link is determined to transmit packet
on *)
    END det_out;
END C104.
```

I claim:

1. A method for routing messages to destination addresses in networks with switching elements, comprising the steps of:

assigning to each destination address at each switching element a group of outputs of said each switching element, searching for a free output within said group of outputs, delaying each of said messages as long as no output is free within the group, and connecting individual outputs of the group to different transmission paths, wherein said step of assigning said group of outputs takes place in such a way that each destination address has a sub-set of all the destination addresses assigning to it and each of these sub-sets has a group of outputs assigned to it.

2. A method for routing messages to destination addresses in networks with switching elements, comprising the steps of:

assigning to each destination address at each switching element a group of outputs of said each switching element, searching for a free output within said group of outputs, delaying each of said messages as long as no output is free within the group, and connecting individual outputs of the group to different transmission paths assigning to the set of all destination addresses an address interval which is subdivided into address sub-intervals, assigning to the set of all outputs an output interval which is subdivided into output sub-intervals, and assigning to each address sub-interval an output sub-interval.

* * * * *